(12) United States Patent
Zhao et al.

(10) Patent No.: US 11,892,734 B2
(45) Date of Patent: Feb. 6, 2024

(54) DISPLAY PANEL, MANUFACTURING METHOD THEREOF, AND DISPLAY DEVICE

(71) Applicants: Hefei Xinsheng Optoelectronics Technology Co., Ltd., Anhui (CN); BOE Technology Group Co., LTD., Beijing (CN)

(72) Inventors: Tingting Zhao, Beijing (CN); Tong Yang, Beijing (CN); Yongcan Wang, Beijing (CN); Xianjie Shao, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 108 days.

(21) Appl. No.: 17/771,848

(22) PCT Filed: May 12, 2021

(86) PCT No.: PCT/CN2021/093389
§ 371 (c)(1),
(2) Date: Apr. 26, 2022

(87) PCT Pub. No.: WO2022/001396
PCT Pub. Date: Jan. 6, 2022

(65) Prior Publication Data
US 2022/0373847 A1 Nov. 24, 2022

(30) Foreign Application Priority Data
Jun. 29, 2020 (CN) .......................... 202010602840.0

(51) Int. Cl.
*G02F 1/1362* (2006.01)
*G02F 1/1335* (2006.01)

(52) U.S. Cl.
CPC .. *G02F 1/136222* (2021.01); *G02F 1/133512* (2013.01); *G02F 1/136209* (2013.01); *G02F 1/136227* (2013.01)

(58) Field of Classification Search
None
See application file for complete search history.

(56) References Cited

U.S. PATENT DOCUMENTS

2016/0266445 A1\* 9/2016 Wang ................ G02F 1/133345

\* cited by examiner

*Primary Examiner* — Phu Vu
(74) *Attorney, Agent, or Firm* — Lippes Mathias LLP

(57) ABSTRACT

Provided is a display panel. The display panel comprises an array substrate and a color filter substrate, wherein the color filter substrate comprises a second substrate and a black matrix pattern, wherein the black matrix pattern comprises a body, via hole shielding parts, and compensation shielding parts, the via hole shielding parts being disposed within first domains of part of plurality of sub-pixel regions, the compensation shielding parts being disposed within second domains that are adjacent in first direction to the first domains where the via hole shielding parts are disposed, and at most one of the via hole shielding part and the compensation shielding part being disposed in one sub-pixel region.

20 Claims, 6 Drawing Sheets

DISPLAY PANEL, MANUFACTURING METHOD THEREOF, AND DISPLAY DEVICE

CROSS-REFERENCE TO RELATED APPLICATION

This application is a 371 of PCT application No. PCT/CN2021/093389, filed on May 12, 2021, which claims priority to Chinese Patent Application No. 202010602840.0, filed on Jun. 29, 2020 and entitled "DISPLAY PANEL AND MANUFACTURING METHOD THEREFOR, AND DISPLAY APPARATUS," the disclosures of which are herein incorporated by reference in their entireties.

TECHNICAL FIELD

The present disclosure relates to the field of display devices, and in particular to a display panel, a manufacturing method thereof, and a display device.

BACKGROUND

A liquid crystal display device is a common display device. At present, there is a type of liquid crystal display device including sub-pixels with two-domain structures. In this liquid crystal display device, each sub-pixel region defined by a black matrix on a color filter substrate includes a first domain and a second domain, wherein the areas of the first domain and the second domain are approximately equal.

SUMMARY

Embodiments of the present disclosure provide a display panel, a manufacturing method thereof, and a display device.

In a first aspect, an embodiment of the present disclosure provides a display panel. The display panel includes an array substrate and a color filter substrate that are oppositely arranged; wherein the array substrate includes a first substrate, a common electrode, a plurality of auxiliary common electrodes, and a first insulating layer, wherein the first insulating layer is between the plurality of auxiliary common electrodes and the common electrode and is provided with via holes, and the auxiliary common electrodes are connected to the common electrode via the via holes; and the color filter substrate includes a second substrate and a black matrix pattern, wherein the black matrix pattern includes a body, via hole shielding parts, and compensation shielding parts, both the hole shielding part and the compensation shielding part being connected to the body, wherein the body defines a plurality of sub-pixel regions arranged in an array on the second substrate, wherein each sub-pixel region includes a first domain and a second domain, the first domains alternating with the second domains in a first direction in which the first domain and the second domain in a same sub-pixel region are arranged, and the via hole shielding parts are disposed within the first domains of part of the plurality of sub-pixel regions, orthographic projections of the via holes on the first substrate are within orthographic projections of the via hole shielding parts on the first substrate, the compensation shielding parts are disposed within the second domains that are adjacent in the first direction to the first domains where the via hole shielding parts are disposed, and at most one of the via hole shielding part and the compensation shielding part is disposed in one sub-pixel region.

Optionally, the via hole shielding part is disposed at a corner formed by a boundary region between two adjacent sub-pixel regions in the first direction and a boundary region between two adjacent sub-pixel regions in a second direction, wherein the second direction is intersected with the first direction.

Optionally, the compensation shielding part is disposed near the boundary region between two adjacent sub-pixel regions in the first direction.

Optionally, a boundary line of the second domain where the compensation shielding part is disposed is a straight line.

Optionally, the via hole shielding parts that are adjacent to each other in the first direction are spaced by at least one sub-pixel region.

Optionally, the via hole shielding parts that are adjacent to each other in a second direction are spaced by at least one sub-pixel region, the second direction being intersected with the first direction.

Optionally, the via hole shielding parts that are adjacent to each other in the second direction are spaced by 2 to 5 sub-pixel regions.

Optionally, the via hole shielding parts that are adjacent to each other in the second direction are spaced by an odd number of sub-pixel regions, wherein the compensation shielding part is disposed in a middle sub-pixel region among the odd number of sub-pixel regions.

Optionally, aperture ratios of the sub-pixel regions where the via hole shielding parts are disposed are equal to aperture ratios of the sub-pixel regions where the compensation shielding parts are disposed.

Optionally, a difference of aperture ratios of any two sub-pixel regions does not exceed 3%.

Optionally, the sub-pixel regions where the via hole shielding parts are disposed are blue sub-pixel regions.

Optionally, a minimum distance between edges of the orthographic projections of the via holes on the first substrate and edges of the orthographic projections of the via hole shielding parts on the first substrate ranges from 3.5 to 6 microns.

In a second aspect, an embodiment of the present disclosure further provides a display device including the display panel described in the first aspect.

In a third aspect, an embodiment of the present disclosure further provides a method for manufacturing a display panel. The method includes:

providing an array substrate, the array substrate including a first substrate, a common electrode, a plurality of auxiliary common electrodes, and a first insulating layer, wherein the plurality of auxiliary common electrodes are spaced on the first substrate, the first insulating layer is disposed on the plurality of auxiliary common electrodes, the common electrode is disposed on the first insulating layer, the first insulating layer is provided with via holes, and the auxiliary common electrodes are connected to the common electrode via the via holes;

providing a color filter substrate, the color filter substrate including a second substrate and a black matrix pattern, wherein the black matrix pattern includes a body, via hole shielding parts, and compensation shielding parts, both the hole shielding part and the compensation shielding part being connected to the body, wherein the body defines a plurality of sub-pixel regions arranged in an array on the second substrate, wherein each sub-pixel region includes a first domain and a second domain, the first domains alternating with the second domains in a first direction in which the first domain and the second domain of a same sub-pixel region are arranged, and the via hole shielding parts are disposed within the first domains of part of the plurality of sub-pixel regions, the compensation shielding parts are disposed within the second domains that are adjacent in the first direction to the first domains where the via hole shielding parts are disposed, and at most one of the via hole shielding part and the compensation shielding part is disposed in one sub-pixel region; and arranging the color filter substrate and the array substrate oppositely to cause orthographic projections of the via holes on the first substrate to be within orthographic projections of the via hole shielding parts on the first substrate.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Embodiments of the present disclosure are described in detail hereafter with reference to the accompanying drawings, to ensure that the objects, technical solutions, and advantages of the present disclosure are clear.

Liquid crystal molecules in a liquid crystal display device generally have elliptical or rodlike structures, a difference of electron densities in a major-axis direction and a minor-axis direction results in birefringence, and light rays emitted along a direction parallel to the major-axis and light rays emitted along a direction parallel to the minor-axis have different optical path differences, thereby resulting in a color shift and a gray-scale inversion.

Figure 1:
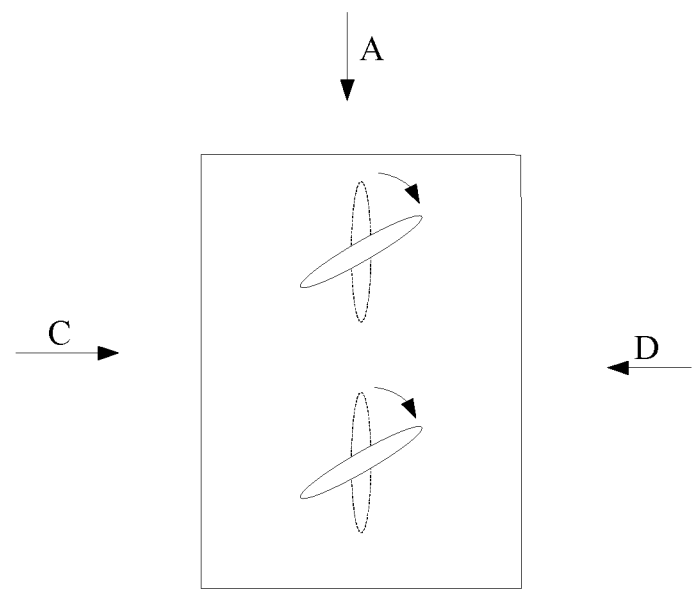
FIG. 1 is a schematic diagram of a deflection of liquid crystal molecules in a one-domain technology.

A one-domain technology and a two-domain technology are two liquid crystal display technologies. A liquid crystal display device employing the one-domain technology includes sub-pixels with one-domain structures, and FIG. 1 is a schematic diagram of a deflection of liquid crystal molecules in the one-domain technology. As shown in FIG. 1, in the liquid crystal display device with the one-domain structure, the liquid crystal molecules in one sub-pixel region have a same orientation. Dotted lines indicate an initial alignment direction of the liquid crystal molecules, and turning arrows indicate the deflection direction of the liquid crystal molecules. For a single alignment direction and a single electric field direction, the one-domain structure has a single liquid crystal deflection direction, resulting in differences in gray-scale or color in four directions A, B, C, and D in human eyes and causing a color shift.

Figure 2:
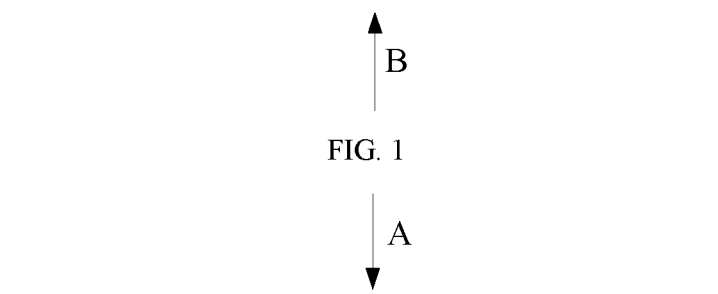
FIG. 2 is a schematic diagram of a deflection of liquid crystal molecules in a two-domain technology.
Figure 2:
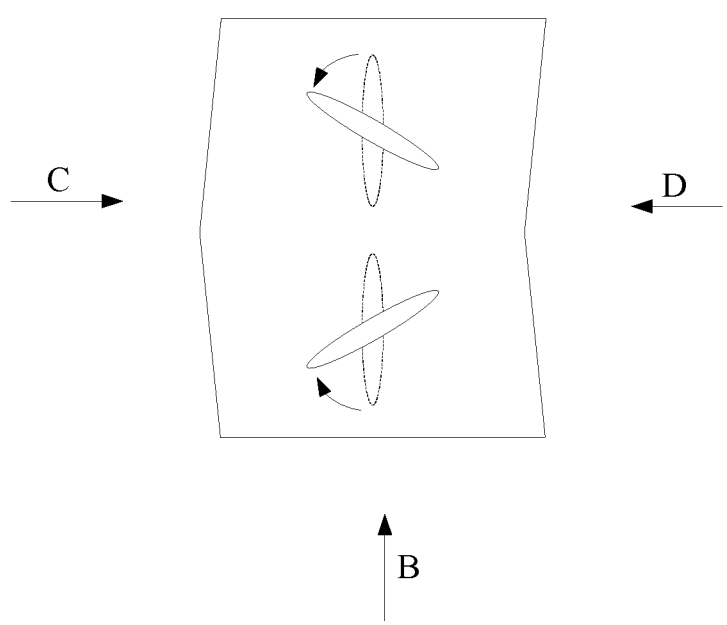

In comparison with the one-domain technology, the two-domain technology is beneficial to improve the display effect of the liquid crystal display device and reduce problems such as the color shift, and thus in the related art, the liquid crystal display device usually adopts sub-pixels with two-domain structures. FIG. 2 is a schematic diagram of a deflection of liquid crystal molecules in the two-domain technology. As shown in FIG. 2, in the liquid crystal display device with a two-domain structure, one sub-pixel includes two parts, and for a single alignment direction and two electric field directions, the liquid crystal molecules in the two parts symmetrically deflect up and down and right and left, to realize complementation between the up and down deflection and complementation between the left and right deflection to reduce the differences in gray-scale or color in the four directions A, B, C, and D.

Figure 3:
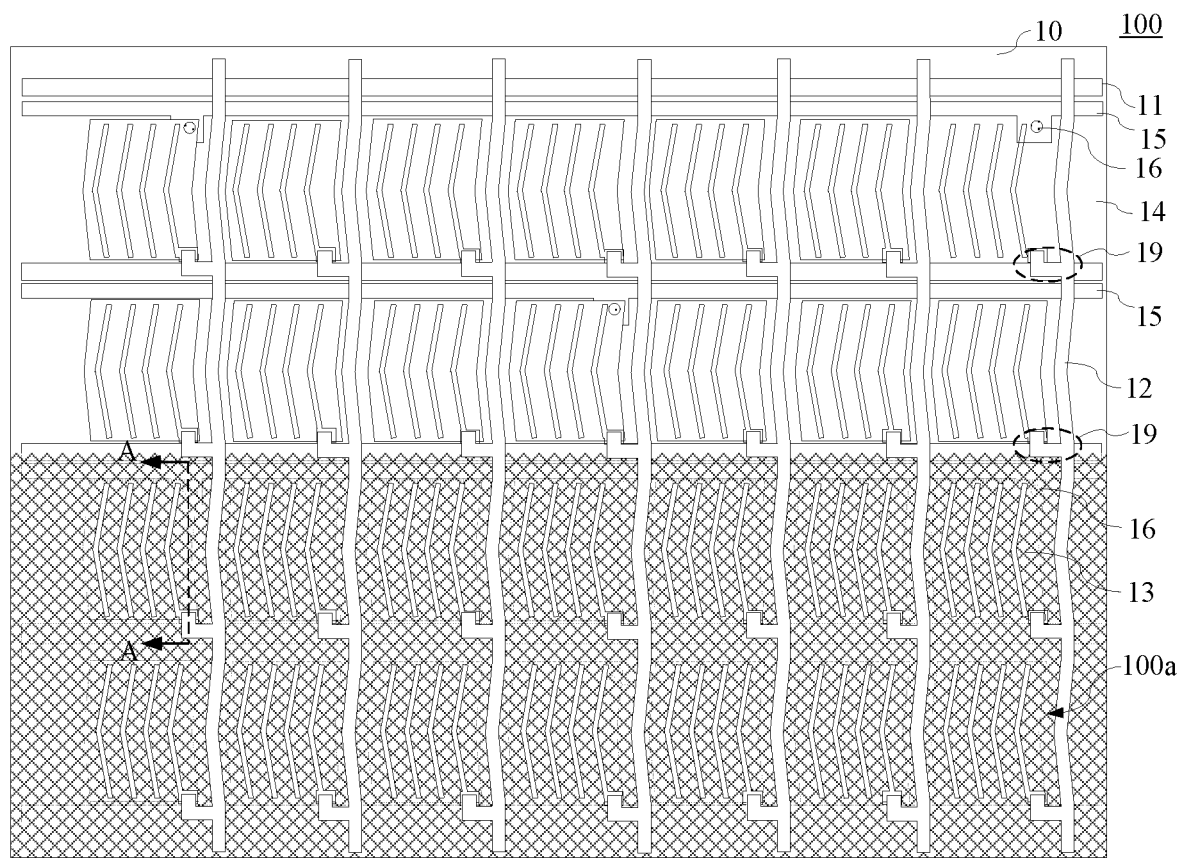
FIG. 3 is a top view of an array substrate in the related art.

FIG. 3 is a top view of an array substrate in the related art. The array substrate is an array substrate of the liquid crystal display device employing the two-domain technology. As shown in FIG. 3, the array substrate 100 includes a first substrate 10 and a conductive pattern formed on the first substrate 10.

As shown in FIG. 3, the conductive pattern includes a plurality of gate lines 11, a plurality of data lines 12, a plurality of pixel electrodes 13, a common electrode 14, and a plurality of auxiliary common electrodes 15. The plurality of gate lines 11 and the plurality of auxiliary common electrodes 15 are alternately disposed in parallel on the first substrate 10, and the gate lines 11 and the auxiliary common electrodes 15 are made of a same layer of material, and generally may be made of a same layer of metal material through a patterning process. The plurality of gate lines 11 and the plurality of data lines 12 define a plurality of sub-pixel regions 100a by crossing on the first substrate 10, wherein the pixel electrodes 13 are disposed in the sub-pixel regions 100a, and the pixel electrodes 13 are connected to the data lines 12 via thin film transistors 19 (as shown by elliptical dashed boxes in FIG. 3). The common electrode 14 is a surface electrode and is disposed on a layer where the gate lines 11 and the auxiliary common electrodes 15 are disposed and a layer where the pixel electrodes 13 are disposed. In order to facilitate viewing the common electrode 14, one pixel electrode 13 at an upper right corner is removed in FIG. 3. The common electrode 14 is connected to the auxiliary common electrodes 15 via a plurality of via holes 16. An electric field for deflecting the liquid crystal molecules is formed between the pixel electrodes 13 and the common electrode 14 upon powering up.

Taking an extending direction of the gate lines 11 as a row direction and an extending direction of the data lines 12 as a column direction, the auxiliary common electrodes 15 extend in the row direction, and each auxiliary common electrode 15 is connected to the common electrode 14 via a plurality of spaced via holes 16 to form a matrix common electrode (Matrix Vcom).

Figure 4:
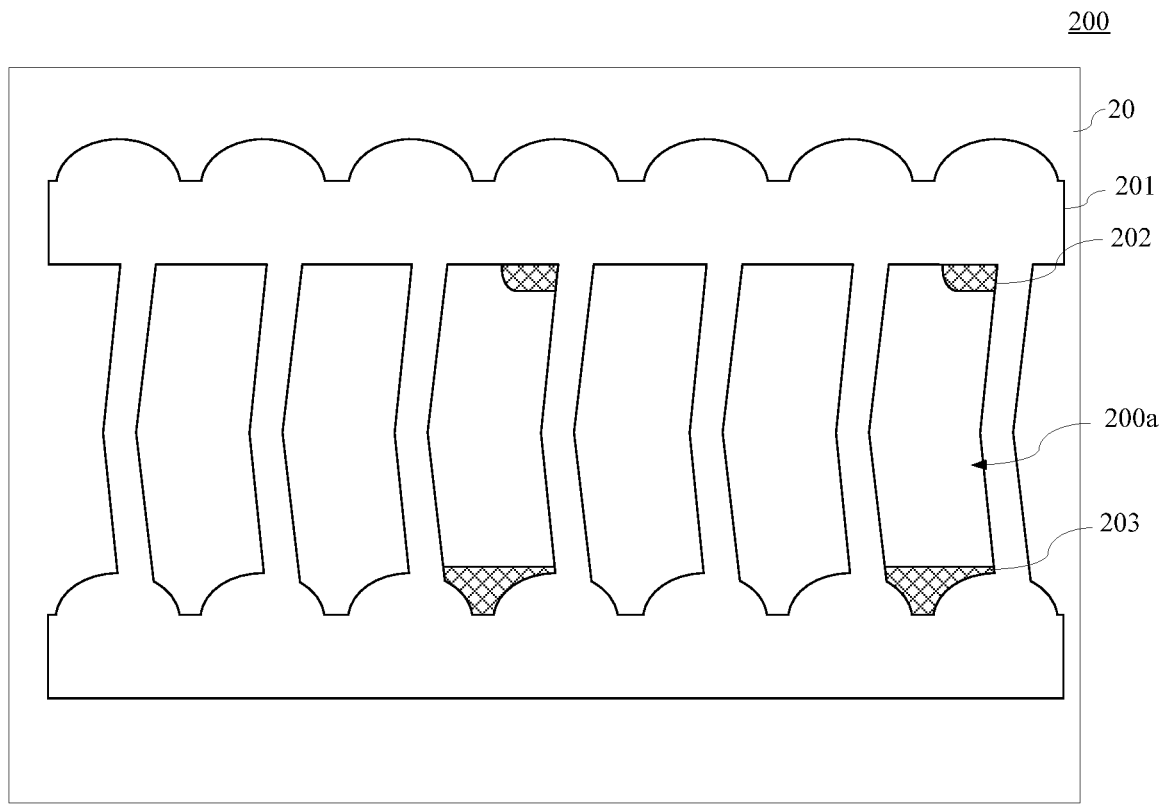
FIG. 4 is a schematic structural diagram of a color filter substrate in the related art.

FIG. 4 is a schematic structural view of a color filter substrate in the related art. The color filter substrate 200 is configured to cooperate with the array substrate 100 shown in FIG. 3 when forming a display panel. As shown in FIG. 4, the color filter substrate 200 includes a second substrate 20 and a black matrix pattern, wherein the black matrix pattern includes a body 201. The body 201 defines a plurality of sub-pixel regions 200a on the second substrate 20. When manufacturing the display panel, the sub-pixel regions 200a on the color filter substrate 200 are one-to-one corresponding to the sub-pixel regions 100a on the array substrate 100.

Because the auxiliary common electrodes 15 are connected to the common electrode 14 via the via holes 16, in order to shield the regions of the via holes 16, as shown in FIG. 4, the black matrix pattern further includes via hole shielding parts 202. The via hole shielding parts 202 are disposed within the sub-pixel regions 200a on the color filter substrate 200 and connected to the body 201 to form a whole. When arranging the color filter substrate 200 and the array substrate 100 oppositely, orthographic projections of the via hole shielding parts 202 on the array substrate 100 cover the via holes 16, so as to shield the via holes 16.

Figure 5:
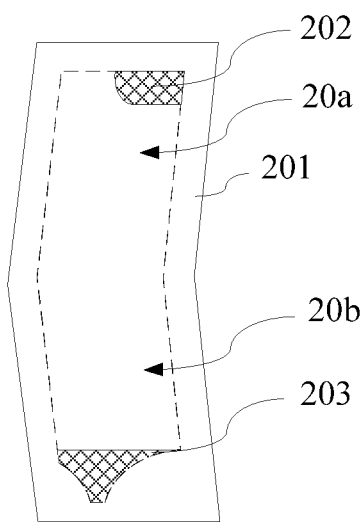
FIG. 5 is a schematic diagram of a sub-pixel region in FIG. 4.

Taking the color filter substrate 200 shown in FIG. 4 as an example, FIG. 5 is a schematic diagram of a sub-pixel region in FIG. 4. The region defined by a dotted line in FIG. 5 is the sub-pixel region. As shown in FIG. 5, the sub-pixel region 200a on the color filter substrate 200 includes a first domain 20a and a second domain 20b, wherein the first domain 20a and the second domain 20b are two regions in the sub-pixel region 200a of the color filter substrate 200 that respectively correspond to two parts in a sub-pixel with a two-domain structure. In a same sub-pixel region 200a, the first domain 20a and the second domain 20b are arranged in the column direction, and the via hole shielding part 202 is disposed within the first domain 20a. The aperture ratio of the first domain 20a and the aperture ratio of the second domain 20b are generally equal or approximately equal. The aperture ratio herein refers to a ratio of an area of a light-transmittable region to a total area, for example, the aperture ratio of the first domain 20a refers to a ratio of an area of a light-transmittable region of the first domain 20a to the total area of the first domain 20a. Because the via hole shielding part 202 is not penetrable by light, the area of the light-transmittable region of the first domain 20a is reduced due to the via hole shielding part 202, but the total area of the first domain 20a is unchanged. Therefore, in the sub-pixel region 200a where the via hole shielding part 202 is disposed, the aperture ratio of the first domain 20a is reduced, such that a large difference occurs between the aperture ratio of the first domain 20a and the aperture ratio of the second domain 20b, which may cause a color shift problem and affect the display effect.

As shown in FIG. 5, in order to reduce the aperture ratio of the second domain 20b of the sub-pixel region 200a where the via hole shielding part 202 is disposed, so as to return the aperture ratio of the first domain 20a and the aperture ratio of the second domain 20b in the sub-pixel region 200a where the via hole shielding part 202 is disposed to be equal or similar, the black matrix pattern further includes compensation shielding parts 203. The compensation shielding parts 203 are disposed within the second domains 20b of the sub-pixel regions 200a where the via hole shielding parts 202 are disposed.

Because the compensation shielding parts 203 are opaque, the compensation shielding parts 203 may reduce the areas of the light-transmittable regions of the second domains 20b. However, the total areas of the second domains 20b are constant, such that the aperture ratios of the second domains 20b of the sub-pixel regions 200a where the via hole shielding parts 202 are disposed are reduced due to the existence of the compensation shielding parts 203. By adjusting the sizes of the compensation shielding parts 203, the aperture ratios of the first domains 20a and the aperture ratios of the second domains 20b in the sub-pixel regions 200a where the via hole shielding parts 202 are disposed can be restored to be equal or similar, such that the color shift may be reduced. However, the arrangement of the compensation shielding parts 203 further reduces the aperture ratios of the sub-pixel regions 200a where the via hole shielding parts 202 are disposed, namely the ratios of the areas of the light-transmittable regions of the sub-pixel regions 200a to the total areas of the sub-pixel regions 200a, such that differences between the aperture ratios of the sub-pixel regions 200a where the via hole shielding parts 202 are disposed and aperture ratios of the other sub-pixel regions 200a become even greater, which may cause horizontal stripes on the liquid crystal display device and affect the display effect.

Figure 6:
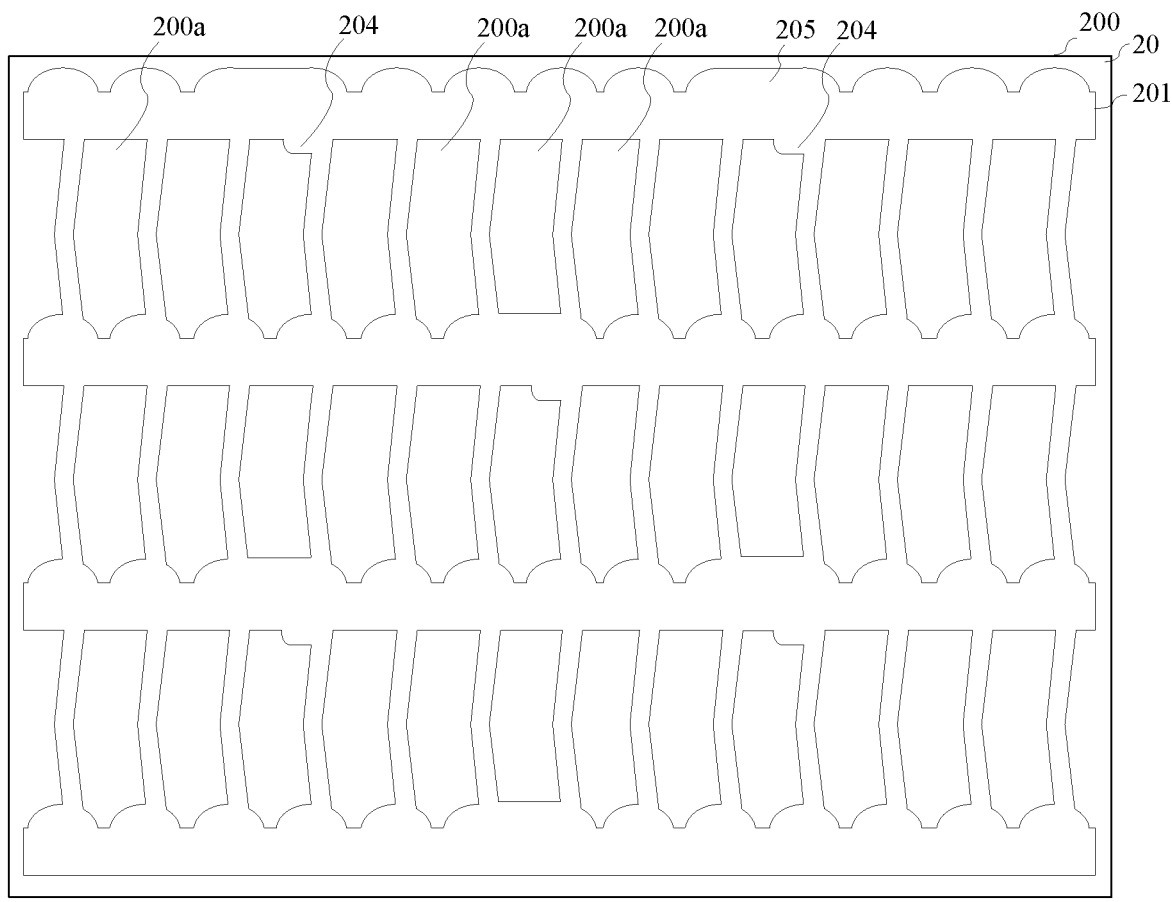
FIG. 6 is a top view of a display panel according to an embodiment of the present disclosure.

An embodiment of the present disclosure provides a schematic structural diagram of a display panel. The display panel includes an array substrate 100 and a color filter substrate 200 that are oppositely arranged. FIG. 6 is a top view of the display panel according to the embodiment of the present disclosure. The array substrate 100 is under the color filter substrate 200 shown in FIG. 6. As shown in FIG. 6, the color filter substrate 200 includes a second substrate 20 and a black matrix pattern, wherein the black matrix pattern includes a body 201, via hole shielding parts 204, and compensation shielding parts 205, both the hole shielding part 204 and the compensation shielding part 205 being connected to the body 201.

Figure 7:
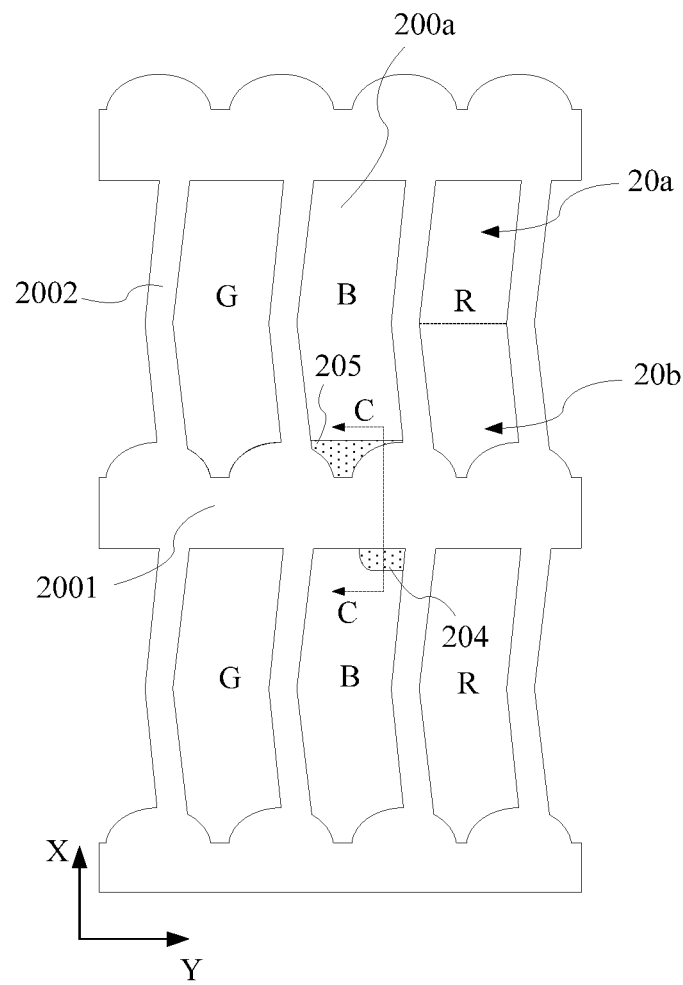
FIG. 7 is a partially enlarged schematic diagram of FIG. 6.

The body 201 defines a plurality of sub-pixel regions 200a arranged in an array on the second substrate 202. FIG. 7 is a partially enlarged schematic diagram of FIG. 6. As shown in FIG. 7, each sub-pixel region 200a includes a first domain 20a and a second domain 20b. The first domains 20a alternate with the second domains 20b in a first direction in which the first domain 20a and the second domain 20b in a same sub-pixel region are arranged.

As shown in FIG. 7, in a second direction, the first domains 20a in different sub-pixel regions are adjacent, the second domains 20b in different sub-pixel regions are adjacent, wherein the second direction is intersected with the first direction.

Illustratively, the first direction herein may be a column direction in which the sub-pixel regions 200a are arranged, i.e., an X direction shown in FIG. 7, and the second direction may be a row direction in which the sub-pixel regions 200a are arranged, i.e., a Y direction shown in FIG. 7, wherein the first direction and the second direction may be parallel to boundaries of the second substrate 20.

The via hole shielding parts 204 are disposed within the first domains 20a of part of the plurality of sub-pixel regions 200a. The via hole shielding parts 204 are configured to shield the via holes (referring to the via holes 16 shown in FIG. 3) for connecting the common electrode to the auxiliary common electrodes in the case that the color filter substrate 200 is assembled with the array substrate 100.

The compensation shielding parts 205 are disposed within the second domains 20b that are adjacent in the first direction to the first domains 20a where the via hole shielding parts 204 are disposed, and at most one of the via hole shielding part 204 and the compensation shielding part 205 is disposed in one sub-pixel region 200a.

Figure 8:
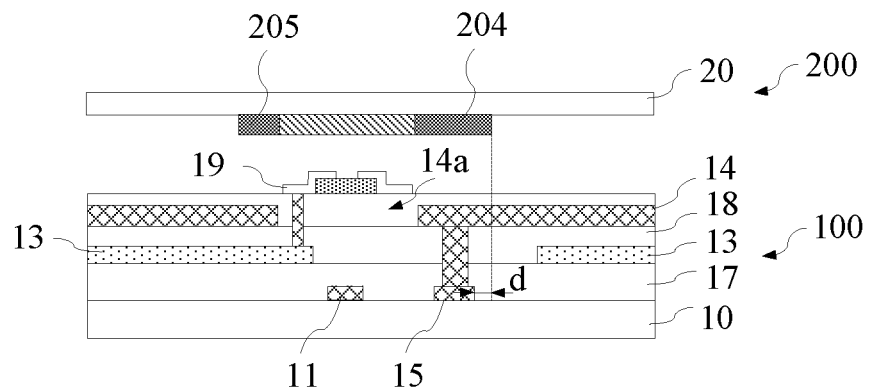
FIG. 8 is a cross-sectional view along C-C in FIG. 7.

FIG. 8 is a cross-sectional view along C-C in FIG. 7. As shown in FIG. 8, the array substrate 100 includes a first substrate 10, a common electrode 14, a plurality of auxiliary common electrodes 15, and a first insulating layer 17. The plurality of auxiliary common electrodes 15 are spaced on the first substrate 10, the first insulating layer 17 is disposed on the plurality of auxiliary common electrodes 15, and the common electrode 14 is disposed on the first insulating layer 17. The first insulating layer 17 is provided with via holes 16, the auxiliary common electrodes 15 are connected to the common electrode 14 via the via holes 16, and orthographic projections of the via holes 16 on the first substrate 10 are within orthographic projections of the via hole shielding parts 204 on the first substrate 10.

A minimum distance d between edges of the orthographic projections of the via holes 16 on the first substrate 10 and edges of the orthographic projections of the via hole shielding parts 204 on the first substrate 10 ranges from 3.5 to 6 microns, so as to ensure that the via hole shielding parts 204 can shield the via holes 16 to avoid light leakage, and at the same time ensure that corresponding sub-pixels have appropriate aperture ratios.

The common electrode 14 is further provided with a plurality of through holes 14a, wherein via holes for connecting to the pixel electrodes 13 are formed in the through holes 14a, and thin film transistors 19 are connected to the pixel electrodes 13 via the via holes for connecting to the pixel electrodes 13.

Figure 9:
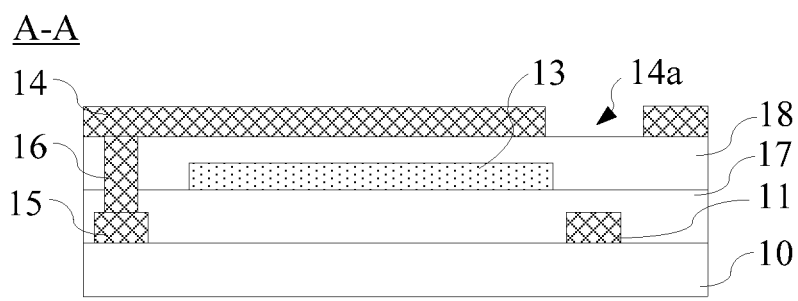
FIG. 9 is a schematic cross-sectional view along A-A in FIG. 3.

The array substrate 100 is an array substrate with a matrix common electrode. For example, the array substrate 100 may be the array substrate shown in FIG. 3. FIG. 9 is a cross-sectional view along A-A in FIG. 3. The thin film transistors 19 connecting the pixel electrodes 13 and the data lines 12 are omitted in FIG. 9. Referring to FIG. 3 and FIG. 9, the plurality of gate lines 11 and the plurality of data lines 12 define a plurality of sub-pixel regions 100a by crossing on the first substrate 10. The plurality of gate lines 11 and the plurality of auxiliary common electrodes 15 are alternately spaced on the first substrate 10. The plurality of gate lines 11 and the plurality of auxiliary common electrodes 15 are covered with the first insulating layer 17, the plurality of pixel electrodes 13 are arranged in an array on the first insulating layer 17, each sub-pixel region 100a is provided with one pixel electrode 13, the plurality of pixel electrodes 13 are covered with a second insulating layer 18, the common electrode 14 is disposed on the second insulating layer 18, and the common electrode 14 is connected to the auxiliary common electrodes 15 via the via holes 16.

The via hole shielding parts and the compensation shielding parts are provided, wherein the via hole shielding parts are configured to shield the via holes for connecting the common electrode to the auxiliary common electrodes and may reduce the aperture ratios of the first domains of the sub-pixel regions where the via hole shielding parts are disposed, and the compensation shielding parts reduce the aperture ratios of the second domains of the sub-pixel regions where the compensation shielding parts are disposed. In a sub-pixel region where the via hole shielding part or the compensation shielding part is disposed, the aperture ratios of the first domain and the second domain of the same sub-pixel region are not equal. However, regarding a sub-pixel region where the via hole shielding part is disposed and an adjacent sub-pixel region thereof in the first direction where the compensation shielding part is disposed as a whole and as a larger sub-pixel region, the two sub-pixel regions are equivalent to two domains of the larger sub-pixel region, wherein one of the two domains includes the via hole shielding part, and the other domain includes the compensation shielding part, that is, each of the two domains is affected by one of the shielding parts. Therefore, a difference of aperture ratios of the two domains of the larger sub-pixel region is small, and the color shift of the display device can be reduced. Moreover, at most one of the via hole shielding part and the compensation shielding part is disposed in one sub-pixel region, such that the difference between the aperture ratio of the sub-pixel region where the via hole shielding part or the compensation shielding part is disposed and the aperture ratio of the sub-pixel region where neither the via hole shielding part nor the compensation shielding part is disposed is affected by only one of the shielding parts, which is beneficial to reduce the difference in aperture ratio between different sub-pixel regions, weaken horizontal stripes appearing in the liquid crystal display device, and improve the display effect. Moreover, the effect can be improved only by changing the black matrix pattern without affecting other processes, and the cost is low.

Optionally, both the first substrate 10 and the second substrate 20 are glass substrates, plastic substrates, or quartz substrates. The glass substrates, plastic substrates, or quartz substrates have better transparency.

Optionally, the black matrix pattern is made of a black resin material.

As shown in FIG. 6, the via hole shielding parts 204 that are adjacent in the first direction are spaced by one sub-pixel region 200a.

As described above, the distribution of the sub-pixel regions 200a on the color filter substrate 200 corresponds to the distribution of the sub-pixel regions 100a on the array substrate. In the case that the via hole shielding parts 204 that are adjacent in the first direction on the color filter substrate 200 are spaced by one sub-pixel region 200a, the sub-pixel regions 100a that are provided with the via holes 16 and adjacent in the same direction on the array substrate corresponding to the color filter substrate 200 are spaced by one sub-pixel region 100a. The more the sub-pixel regions 100a are disposed between the adjacent sub-pixel regions 100a that are provided with the via holes 16, the more sparsely the via hole shielding parts 204 are distributed in the first direction, the harder the via hole shielding parts 204 are to be perceived during the display of a picture by the display panel, and the less the display effect is affected. Therefore, the via hole shielding parts 204 that are adjacent in the first direction are spaced by at least one sub-pixel region 200a.

As shown in FIG. 6, the via hole shielding parts 204 that are adjacent in the second direction are spaced by five sub-pixel regions 200a.

In the second direction, in the case that the via hole shielding parts 204 are arranged too densely, that is, the adjacent via hole shielding parts 204 are spaced by fewer or even zero sub-pixel region 200a, the plurality of via shielding parts 204 and the plurality of compensation shielding parts 205 in the same row in the second direction may form a large shielding area, which may be so visually obvious that the display effect is influenced. By spacing the adjacent via hole shielding parts 204 with a specific number of sub-pixel regions 200a, this influence can be reduced and the display effect can be improved.

Optionally, the via hole shielding parts 204 that are adjacent in the second direction are spaced by 2-5 sub-pixel regions 200a. For the matrix common electrode, in the row direction, one via hole 16 is generally disposed every 2 or 5 sub-pixel units 200a to connect the auxiliary common electrodes 15 to the common electrodes 14; and the number of the sub-pixel regions 200a disposed between the adjacent via hole shielding parts 204 in the color filter substrate 200 in the second direction may be determined depending on the matrix common electrode on the array substrate.

Optionally, the via hole shielding parts 204 that are adjacent to each other in the second direction are spaced by an odd number of sub-pixel regions 200a, wherein the compensation shielding part 205 is disposed in a middle sub-pixel region among the odd number of sub-pixel regions 200a. For example, in the embodiment, the via hole shielding parts 204 that are adjacent to each other in the second direction are spaced by 5 sub-pixel regions 200a, and the compensation shielding part 205 is disposed in the middle sub-pixel region among the 5 sub-pixel regions 200a. The via hole shielding parts 204 and the compensation shielding parts 205 are staggered in the second direction and are distributed more uniformly on the whole, and a viewer is less likely to perceive the presence of the via hole shielding parts 204 and the compensation shielding parts 205, such that the whole display effect of the liquid crystal display device is less affected.

As shown in FIG. 7, a boundary region between two adjacent sub-pixel regions 200a in the first direction includes a first boundary region 2001, and a boundary region between two adjacent sub-pixel regions 200a in the second direction includes a second boundary region 2002. The first boundary regions 2001 are intersected with the second boundary regions 2002. The first boundary region 2001 and the second boundary region 2002 are both a part of the body 201.

Optionally, the via hole shielding parts 204 are disposed at corners of the sub-pixel regions 200a, i.e., at corners formed by the first boundaries 2001 and the second boundaries 2002. On the array substrate 100, the sub-pixel regions 100a are generally shaped like a rough polygon, and the via holes 16 are generally disposed at corners of the sub-pixel regions 100a to reduce the influence on the aperture ratios. On the color filter substrate 200, the via hole shielding parts 204 are disposed at the corners of the sub-pixel regions 200a to correspond to positions of the via holes 16, so as to provide good shielding for the regions where the via holes 16 are disposed.

Illustratively, the via hole shielding parts 204 are rectangular. The via hole shielding parts 204 may have other shapes, such as a semicircular shape, and the shapes and sizes of the via hole shielding parts 204 may be set according to the shapes and sizes of the regions to be shielded. On the condition that the via holes 16 can be shielded, minimizing the sizes of the via hole shielding parts 204 can facilitate increasing the aperture ratios of the sub-pixel regions 200a and improving the luminance of the liquid crystal display device.

Optionally, the compensation shielding part 205 is disposed near the boundary region between two adjacent sub-pixel regions 200a in the first direction. As shown in FIG. 7, the compensation shielding part 205 is connected to the first boundary region 2001.

The sizes of the compensation shielding parts 205 and the via hole shielding parts 204 may be equal, such that the influence of the compensation shielding parts 205 on the aperture ratios of the second domains 20b is equal to the influence of the via shielding parts 204 on the aperture ratios of the first domains 20a.

As shown in FIG. 7, the boundary line of the second domain 20b where the compensation shielding part 205 is disposed is a straight line. Comparing the second domains 20b where the compensation shielding part 205 is disposed and the second domains 20b of other sub-pixel regions, the boundaries of the second domains 20b of the other sub-pixel regions 200a are not straight lines, this is because the array substrate further includes structures such as thin film transistors, and in order to shield the structures such as the thin film transistors, the boundary line of the second domain 20b is partially concave and partially convex, thereby presenting a concave-convex shape. In the second domain where the compensation shielding part 205 is disposed, the compensation shielding part 205 fills the concave-convex shape of the boundary line of the second domain 20b, making the boundary line of the second domain 20b straight. The straight boundary line is easier to form during a patterning process. The boundary line of the second domain 20b where the compensation shielding part 205 is disposed may be parallel to one edge of the second substrate 20.

Optionally, the aperture ratios of the sub-pixel regions 200a where the via hole shielding parts 204 are disposed are equal to the aperture ratios of the sub-pixel regions 200a where the compensation shielding parts 205 are disposed. The sub-pixel region 200a where the via hole shielding part 204 is disposed is adjacent to the sub-pixel region 200a where the compensation shielding part 205 is disposed. In the case that the sub-pixel region 200a where the via hole shielding part 204 is disposed and the sub-pixel region 200a where the compensation shielding part 205 is disposed are regarded as a whole and considered as a larger sub-pixel region, the sub-pixel region 200a where the via hole shielding part 204 is disposed and the sub-pixel region 200a where the compensation shielding part 205 is disposed are respectively two domains of the larger sub-pixel region, and the aperture ratio of the sub-pixel region 200a where the via hole shielding part 204 is disposed is equal to the aperture ratio of the sub-pixel region 200a where the compensation shielding part 205 is disposed, that is, the aperture ratios of the two domains of the larger sub-pixel region are equal, which is beneficial to reduce the color shift of the liquid crystal display device.

Optionally, a difference of the aperture ratios of any two sub-pixel regions 200a does not exceed 3%. Due to the influences of the via hole shielding parts 204 and the compensation shielding parts 205 on the aperture ratios, both the aperture ratio of the sub-pixel region 200a where the via hole shielding part 204 is disposed and the aperture ratio of the sub-pixel region 200a where the compensation shielding part 205 is disposed are smaller than the aperture ratios of the other sub-pixel regions 200a. For example, in FIG. 7, both the aperture ratios of the two sub-pixel regions 20a in the second column are smaller than the aperture ratios of the other sub-pixel regions 20a.

In the crystal display device, the difference in aperture ratio between different sub-pixel regions 200a may cause horizontal stripes in a displayed picture, and the greater the difference is, the more obvious the horizontal stripes are. Generally, in the case that the difference in aperture ratio reaches 3%, obvious horizontal stripes may appear on the picture. Controlling the difference in aperture ratio between the plurality of sub-pixel regions 200a to not exceed 3% can facilitate reducing or weakening the horizontal stripes in the displayed picture and improving the display effect.

Optionally, the sub-pixel regions 200a where the via hole shielding parts 204 are disposed are blue sub-pixel regions. In the array substrate 100, there are generally red sub-pixel regions, green sub-pixel regions, and blue sub-pixel regions. The via holes 16 for connecting the common electrode 14 and the auxiliary common electrodes 15 are generally disposed within the blue sub-pixel regions, and the sub-pixel regions 200a where the via hole shielding parts 204 are disposed are blue sub-pixel regions, such that in the case that the array substrate 100 is oppositely arranged to the color filter substrate 200, the via hole shielding parts 204 may just shield the via holes 16 in the blue sub-pixel regions. For the array substrate 100 with the via holes 16 in the red sub-pixel regions or the green sub-pixel regions, the sub-pixel regions 200a where the via hole shielding parts 204 are disposed are also correspondingly red sub-pixel regions or green sub-pixel regions.

An embodiment of the present disclosure further provides a display device. The display device is any product or component with a display function, such as a mobile phone, a tablet computer, a television, a monitor, a notebook computer, a digital photo frame, or a navigator. The display device includes the above-described display panel.

Figure 10:
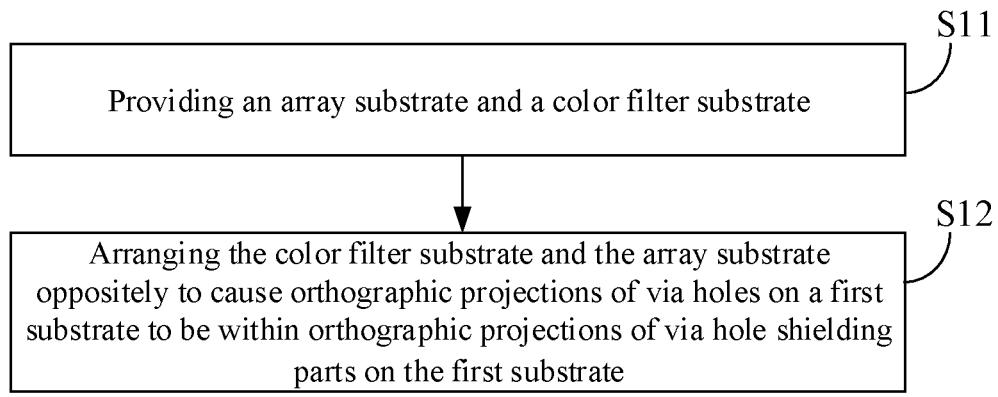
FIG. 10 is a flowchart of a method for manufacturing a display panel according to an embodiment of the present disclosure.

FIG. 10 is a flowchart of a method for manufacturing a display panel according to an embodiment of the present disclosure. The method is used for manufacturing the display panel shown in FIG. 6. As shown in FIG. 10, the method includes the following processes.

In process S11, an array substrate and a color filter substrate are provided.

The array substrate includes a first substrate, a common electrode, a plurality of auxiliary common electrodes, and a first insulating layer, wherein the plurality of auxiliary common electrodes are spaced on the first substrate, the first insulating layer is disposed on the plurality of auxiliary common electrodes, the common electrode is disposed on the first insulating layer, the first insulating layer is provided with via holes, and the auxiliary common electrodes are connected to the common electrode via the via holes. The color filter substrate includes a second substrate and a black matrix pattern, wherein the black matrix pattern includes a body, via hole shielding parts, and compensation shielding parts, both the hole shielding part and the compensation shielding part being connected to the body. The body defines a plurality of sub-pixel regions arranged in an array on the second substrate, wherein each sub-pixel region includes a first domain and a second domain, the first domains alternating with the second domains in a first direction in which the first domain and the second domain of a same sub-pixel region are arranged. The via hole shielding parts are disposed within the first domains of part of the plurality of sub-pixel regions, the compensation shielding parts are disposed within the second domains that are adjacent in the first direction to the first domains where the via hole shielding parts are disposed, and at most one of the via hole shielding part and the compensation shielding part is disposed in one sub-pixel region.

Optionally, both the first substrate and the second substrate are glass substrates, plastic substrates, or quartz substrates. The glass substrates, plastic substrates, or quartz substrates have better transparency.

In a second direction, the first domains in different sub-pixel regions are adjacent, and the second domains in different sub-pixel regions are adjacent, the second direction being intersected with the first direction.

Optionally, the black matrix pattern may be formed of a black resin material on the second substrate through a patterning process. For example, first, a layer of black resin film is formed on the second substrate, and then the black resin film is processed through the patterning process to form the black matrix pattern.

In process S12, the color filter substrate and the array substrate are arranged oppositely to cause orthographic projections of the via holes on the first substrate to be within orthographic projections of the via hole shielding parts on the first substrate.

The via hole shielding parts and the compensation shielding parts are provided, wherein the via hole shielding parts are configured to shield the via holes for connecting the common electrode to the auxiliary common electrodes and may reduce the aperture ratios of the first domains of the sub-pixel regions where the via hole shielding parts are disposed, and the compensation shielding parts reduce the aperture ratios of the second domains of the sub-pixel regions where the compensation shielding parts are disposed. In a sub-pixel region where the via hole shielding part or the compensation shielding part is disposed, the aperture ratios of the first domain and the second domain of the same sub-pixel region are not equal. However, regarding a sub-pixel region where the via hole shielding part is disposed and an adjacent sub-pixel region thereof in the first direction where the compensation shielding part is disposed as a whole and as a larger sub-pixel region, the two sub-pixel regions are equivalent to two domains of the larger sub-pixel region, wherein one of the two domains includes the via hole shielding part, and the other domain includes the compensation shielding part, that is, each of the two domains is affected by one of the shielding parts. Therefore, a difference of aperture ratios of the two domains of the larger sub-pixel region is small, and the color shift of the display device can be reduced. Moreover, at most one of the via hole shielding part and the compensation shielding part is disposed in one sub-pixel region, such that the difference between the aperture ratio of the sub-pixel region where the via hole shielding part or the compensation shielding part is disposed and the aperture ratio of the sub-pixel region where neither the via hole shielding part nor the compensation shielding part is disposed is affected by only one of the shielding parts, which is beneficial to reduce the difference in aperture ratio between different sub-pixel regions, weaken horizontal stripes appearing in the liquid crystal display device, and improve the display effect.

Described above are merely optional embodiments of the present disclosure and are not intended to limit the present disclosure. Any modifications, equivalent replacements, improvements, and the like made within the concept and principle of the present disclosure are included within the scope of protection of the present disclosure.

What is claimed is:

1. A display panel, comprising an array substrate and a color filter substrate that are oppositely arranged; wherein
the array substrate comprises a first substrate, a common electrode, a plurality of auxiliary common electrodes, and a first insulating layer, wherein the first insulating layer is between the plurality of auxiliary common electrodes and the common electrode and is provided with via holes, and the auxiliary common electrodes are connected to the common electrode via the via holes; and
the color filter substrate comprises a second substrate and a black matrix pattern, wherein the black matrix pattern comprises a body, via hole shielding parts, and compensation shielding parts, both the via hole shielding part and the compensation shielding part being connected to the body, wherein
the body defines a plurality of sub-pixel regions arranged in an array on the second substrate, wherein each sub-pixel region comprises a first domain and a second domain, the first domains alternating with the second domains in a first direction in which the first domain and the second domain in a same sub-pixel region are arranged, and the via hole shielding parts are disposed within the first domains of part of the plurality of sub-pixel regions, orthographic projections of the via holes on the first substrate are within orthographic projections of the via hole shielding parts on the first substrate, the compensation shielding parts are disposed within the second domains that are adjacent in the first direction to the first domains where the via hole shielding parts are disposed, and at most one of the via hole shielding part and the compensation shielding part is disposed in one sub-pixel region.

2. The display panel according to claim 1, wherein the via hole shielding part is disposed at a corner formed by a boundary region between two adjacent sub-pixel regions in the first direction and a boundary region between two adjacent sub-pixel regions in a second direction, wherein the second direction is intersected with the first direction.

3. The display panel according to claim 2, wherein the compensation shielding part is disposed near the boundary region between two adjacent sub-pixel regions in the first direction.

4. The display panel according to claim 3, wherein a boundary line of the second domain where the compensation shielding part is disposed is a straight line.

5. The display panel according to claim 1, wherein the via hole shielding parts that are adjacent to each other in the first direction are spaced by at least one sub-pixel region.

6. The display panel according to claim 1, wherein the via hole shielding parts that are adjacent to each other in a second direction are spaced by at least one sub-pixel region, the second direction being intersected with the first direction.

7. The display panel according to claim 6, wherein the via hole shielding parts that are adjacent to each other in the second direction are spaced by 2 to 5 sub-pixel regions.

8. The display panel according to claim 6, wherein the via hole shielding parts that are adjacent to each other in the second direction are spaced by an odd number of sub-pixel regions, wherein the compensation shielding part is disposed in a middle sub-pixel region among the odd number of sub-pixel regions.

9. The display panel according to claim 1, wherein aperture ratios of the sub-pixel regions where the via hole shielding parts are disposed are equal to aperture ratios of the sub-pixel regions where the compensation shielding parts are disposed.

10. The display panel according to claim 1, wherein a difference of aperture ratios of any two sub-pixel regions does not exceed 3%.

11. The display panel according to claim 1, wherein the sub-pixel regions where the via hole shielding parts are disposed are blue sub-pixel regions.

12. The display panel according to claim 1, wherein a minimum distance between edges of the orthographic projections of the via holes on the first substrate and edges of the orthographic projections of the via hole shielding parts on the first substrate ranges from 3.5 to 6 microns.

13. A display device, comprising a display panel, wherein the display panel comprises an array substrate and a color filter substrate that are oppositely arranged; wherein the array substrate comprises a first substrate, a common electrode, a plurality of auxiliary common electrodes, and a first insulating layer, wherein the first insulating layer is between the plurality of auxiliary common electrodes and the common electrode and is provided with via holes, and the auxiliary common electrodes are connected to the common electrode via the via holes; and the color filter substrate comprises a second substrate and a black matrix pattern, wherein the black matrix pattern comprises a body, via hole shielding parts, and compensation shielding parts, both the via hole shielding part and the compensation shielding part being connected to the body, wherein the body defines a plurality of sub-pixel regions arranged in an array on the second substrate, wherein each sub-pixel region comprises a first domain and a second domain, the first domains alternating with the second domains in a first direction in which the first domain and the second domain in a same sub-pixel region are arranged, and the via hole shielding parts are disposed within the first domains of part of the plurality of sub-pixel regions, orthographic projections of the via holes on the first substrate are within orthographic projections of the via hole shielding parts on the first substrate, the compensation shielding parts are disposed within the second domains that are adjacent in the first direction to the first domains where the via hole shielding parts are disposed, and at most one of the via hole shielding part and the compensation shielding part is disposed in one sub-pixel region.

14. A method for manufacturing a display panel, comprising:

providing an array substrate, the array substrate comprising a first substrate, a common electrode, a plurality of auxiliary common electrodes, and a first insulating layer, wherein the plurality of auxiliary common electrodes are spaced on the first substrate, the first insulating layer is disposed on the plurality of auxiliary common electrodes, the common electrode is disposed on the first insulating layer, the first insulating layer is provided with via holes, and the auxiliary common electrodes are connected to the common electrode via the via holes;

providing a color filter substrate, the color filter substrate comprising a second substrate and a black matrix pattern, wherein the black matrix pattern comprises a body, via hole shielding parts, and compensation shielding parts, both the via hole shielding part and the compensation shielding part being connected to the body, wherein the body defines a plurality of sub-pixel regions arranged in an array on the second substrate, wherein each sub-pixel region comprises a first domain and a second domain, the first domains alternating with the second domains in a first direction in which the first domain and the second domain of a same sub-pixel region are arranged, and the via hole shielding parts are disposed within the first domains of part of the plurality of sub-pixel regions, the compensation shielding parts are disposed within the second domains that are adjacent in the first direction to the first domains where the via hole shielding parts are disposed, and at most one of the via hole shielding part and the compensation shielding part is disposed in one sub-pixel region; and arranging the color filter substrate and the array substrate oppositely to cause orthographic projections of the via holes on the first substrate to be within orthographic projections of the via hole shielding parts on the first substrate.

15. The display device according to claim 13, wherein the via hole shielding part is disposed at a corner formed by a boundary region between two adjacent sub-pixel regions in the first direction and a boundary region between two adjacent sub-pixel regions in a second direction, wherein the second direction is intersected with the first direction.

16. The display device according to claim 15, wherein the compensation shielding part is disposed near the boundary region between two adjacent sub-pixel regions in the first direction.

17. The display device according to claim 16, wherein a boundary line of the second domain where the compensation shielding part is disposed is a straight line.

18. The display device according to claim 13, wherein the via hole shielding parts that are adjacent to each other in the first direction are spaced by at least one sub-pixel region.

19. The display device according to claim 13, wherein the via hole shielding parts that are adjacent to each other in a second direction are spaced by at least one sub-pixel region, the second direction being intersected with the first direction.

20. The display device according to claim 13, wherein the via hole shielding parts that are adjacent to each other in the second direction are spaced by 2 to 5 sub-pixel regions.

* * * * *